US011261833B2

(12) United States Patent
Kishimoto et al.

(10) Patent No.: US 11,261,833 B2
(45) Date of Patent: Mar. 1, 2022

(54) BREATHER DEVICE FOR OUTBOARD MOTOR ENGINE

(71) Applicant: SUZUKI MOTOR CORPORATION, Hamamatsu (JP)

(72) Inventors: Morio Kishimoto, Hamamatsu (JP); Yuna Ishida, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/103,541

(22) Filed: Nov. 24, 2020

(65) Prior Publication Data

US 2021/0190020 A1   Jun. 24, 2021

(30) Foreign Application Priority Data

Dec. 20, 2019   (JP) .............................. JP2019-230354

(51) Int. Cl.
*F02M 35/12*   (2006.01)
*F02M 35/10*   (2006.01)
*F02B 61/04*   (2006.01)

(52) U.S. Cl.
CPC ....... *F02M 35/1266* (2013.01); *F02B 61/045* (2013.01); *F02M 35/1015* (2013.01); *F02M 35/10222* (2013.01); *F02M 35/10255* (2013.01)

(58) Field of Classification Search
CPC ........... F02M 35/1266; F02M 35/1015; F02M 35/10255; F02M 35/10222; F02M 25/06; F02B 61/045; F01M 13/00; F01M 2013/005; F01M 2013/0061; F01M 2013/0072; F02D 2250/08

See application file for complete search history.

(56) References Cited

U.S. PATENT DOCUMENTS

| | | | |
|---|---|---|---|
| 6,408,835 B1 | 6/2002 | Katayama et al. | 123/572 |
| 2001/0003691 A1* | 6/2001 | Watanabe | F02B 75/20 440/88 A |
| 2002/0040706 A1 | 4/2002 | Katayama et al. | 123/516 |
| 2002/0073971 A1* | 6/2002 | Katayama | F02B 61/045 123/478 |
| 2003/0000504 A1 | 1/2003 | Katayama et al. | 123/516 |
| 2005/0229891 A1* | 10/2005 | Kokubo | F02M 35/112 123/184.57 |
| 2005/0277343 A1* | 12/2005 | Itoh | B63H 20/002 440/88 R |
| 2007/0243778 A1* | 10/2007 | Kamito | F02M 37/20 440/88 F |
| 2008/0257319 A1* | 10/2008 | Ishizaka | F02M 35/168 123/572 |

(Continued)

FOREIGN PATENT DOCUMENTS

JP   2001-65412 A   3/2001

*Primary Examiner* — Grant Moubry
(74) *Attorney, Agent, or Firm* — Stein IP, LLC (57) ABSTRACT

A breather device for an outboard motor engine, the outboard motor engine including a breather chamber formed in an engine main body, and an intake passage guiding air into the engine main body, in which an intake port of the intake passage is open inside an engine cover that covers the engine main body, the breather device includes a resonator chamber communicating with an upstream side of the intake passage, and a breather passage extending from the breather chamber and communicating with the resonator chamber.

4 Claims, 8 Drawing Sheets

(56) References Cited

U.S. PATENT DOCUMENTS

| | | | | |
|---|---|---|---|---|
| 2010/0018498 A1* | 1/2010 | Hirose | ................... | F02D 9/10 123/337 |
| 2015/0050848 A1* | 2/2015 | Nakamura | ........... | B63H 20/245 440/77 |

\* cited by examiner

FIG. 6A
HIGH ENGINE SPEED RANGE

FIG. 6B
LOW ENGINE SPEED RANGE

BREATHER DEVICE FOR OUTBOARD MOTOR ENGINE

CROSS-REFERENCE TO RELATED APPLICATIONS

This application is based on Japanese Patent Application No. 2019-230354 filed on Dec. 20, 2019, the contents of which are incorporated herein by way of reference.

BACKGROUND

The present disclosure relates to a breather device for an outboard motor engine.

The outboard motor engine is provided with a breather device that returns blow-by gas generated from a crank chamber or the like to an intake passage for re-combust. As such a breather device, one in which a breather chamber is formed in a cylinder head cover is known (for example, see Patent Document 1). In the breather device described in Patent Document 1, the breather chamber of the cylinder head cover and an upstream side of the intake passage are communicated with each other through a breather passage. The oil in the blow-by gas is captured in the breather chamber, and the blow-by gas that has passed through the breather chamber is returned to the upstream side of the intake passage through the breather passage.

Patent Document 1: JP-A-2001-65412

SUMMARY

In the breather chamber, the oil may not be completely separated from the blow-by gas, the blow-by gas containing oil mist may be cooled while passing through the breather passage, and the oil may flow out from the breather chamber to the intake passage. Depending on an engine rotation speed, a positive pressure rather than a negative pressure may act on an intake port of the intake passage due to the pulsating inertia effect (air column resonance effect), and oil may spout from the intake port to the inside of the engine cover. If the oil adheres to parts near the intake port, the durability of the parts and the workability of maintenance deteriorate. Further, if a large amount of oil is sent from the intake passage into a combustion chamber all at once, a proportion of unburned gas in exhaust gas becomes high, which is also undesirable from the viewpoint of environmental measures.

The present disclosure has been made in view of the foregoing, and an object thereof is provide a breather device for an outboard motor engine in which spout of oil to the inside of an engine cover is prevented and combustion in consideration of the environment can be realized.

A breather device for an outboard motor engine according to an aspect of the present disclosure, the outboard motor engine includes a breather chamber formed in an engine main body, and an intake passage guiding air into the engine main body, in which an intake port of the intake passage is open inside an engine cover that covers the engine main body, the breather device includes a resonator chamber communicating with an upstream side of the intake passage, and a breather passage extending from the breather chamber and communicating with the resonator chamber, so that the above problem is solved.

DETAILED DESCRIPTION OF EXEMPLIFIED EMBODIMENTS

In a breather device for an outboard motor engine according to one aspect of the present disclosure, an intake port of an intake passage is opened toward inside of an engine cover that covers an engine main body. A breather chamber formed in the engine main body and a resonator chamber upstream of the intake passage is communicated with each other through a breather passage. Since the resonator chamber communicates with the breather passage and a cavity volume increases, when positive pressure acts on the intake port due to intake pulsation in an engine speed range, such as in a middle engine speed range, suction of oil from the resonator chamber is prevented. Further, the resonator chamber also functions as a catch tank, so that the oil is not sucked directly from the breather passage. Therefore, the spout of oil from the intake port to the inside of the engine cover is prevented, and dirt caused by the oil inside the engine cover is reduced. Further, a large amount of oil is not sucked into the engine main body all at once, and a proportion of unburned gas in exhaust gas can be reduced.

Figure 1:
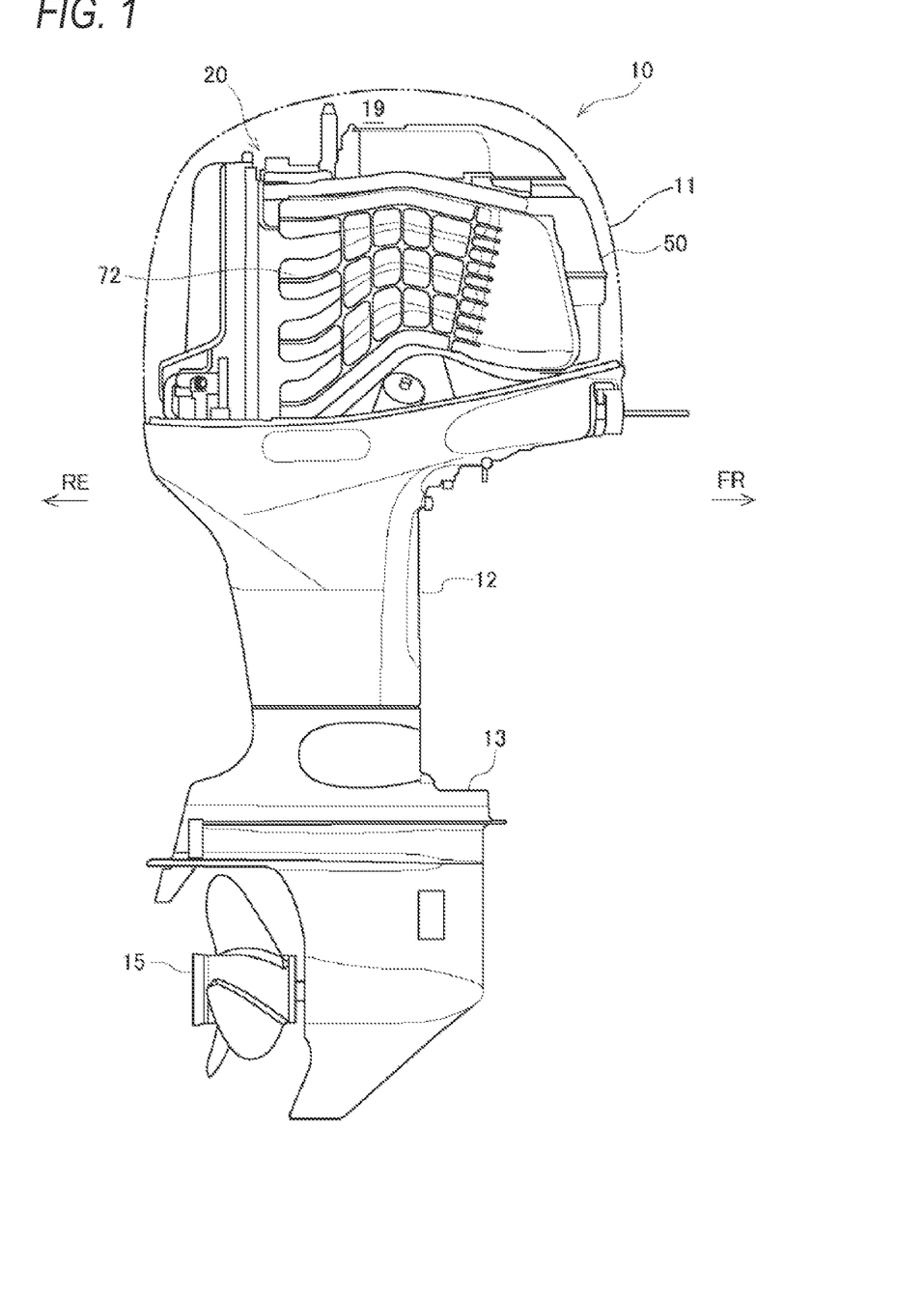
FIG. 1 is a right side view of an outboard motor engine.
Figure 2:
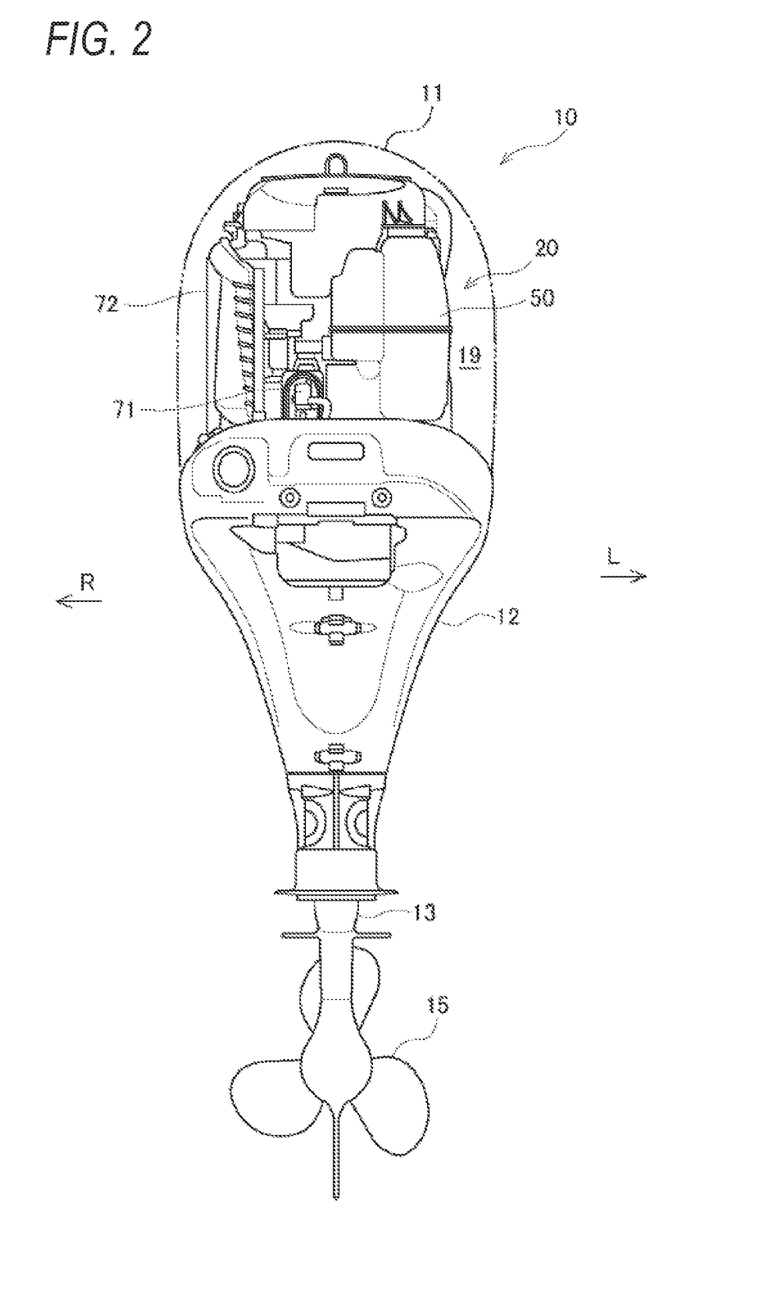
FIG. 2 is a front view of the outboard motor engine.

Hereinafter, an embodiment will be illustrated with reference to the attached drawings. In the following drawings, an arrow FR indicates the front of the engine, an arrow RE indicates the rear of the engine, an arrow L indicates the left side of the engine, and an arrow R indicates the right side of the engine. FIG. 1 is a right side view of an outboard motor engine. FIG. 2 is a front view of the outboard motor engine.

As shown in FIGS. 1 and 2, an outboard motor engine 10 is detachably attached to a stern or the like of a vessel for use, and is configured to transmit a driving force of an engine main body 20 to a propeller 15 to generate a propulsion force on the vessel. An outer shell of the outboard motor engine 10 is formed by an engine cover 11 that accommodates the engine main body 20 and the like, a drive shaft housing 12 that extends downward from the engine cover 11, and a gear case 13 that is provided below the drive shaft housing 12. The propeller 15 having a plurality of fins is attached to the gear case 13. An engine compartment 19 inside the engine cover 11 accommodates various accessories such as an intake device together with the engine main body 20.

The engine main body 20 is a four-cylinder engine in which a plurality of cylinders are arranged vertically in a horizontally oriented state. A crankshaft 37 (see FIG. 3) of the engine main body 20 is oriented in a vertical direction, and the crankshaft 37 is rotated by driving of the engine main body 20. A silencer 50 and a throttle body 71 are provided in front of the engine main body 20, and an intake manifold 72 is provided on a right side of the engine main body 20. An intake passage 75 (see FIG. 3) that guides air to the engine main body 20 is formed by the silencer 50, the throttle body 71, and the intake manifold 72.

Inside the drive shaft housing 12, a drive shaft (not shown) connected to the crankshaft 37 of the engine main body 20 is accommodated in a vertically oriented state. A propeller shaft (not shown) connected to the drive shaft is accommodated in the gear case 13 in a horizontally oriented state. The propeller shaft protrudes rearward from the gear case 13, and the propeller 15 is attached to a protruding portion of the propeller shaft. The rotation of the drive shaft is converted into the rotation of the propeller shaft by a connecting gear of the drive shaft and the propeller shaft, and the power of the outboard motor engine 10 is converted into a propulsion force on the vessel.

Figure 3:
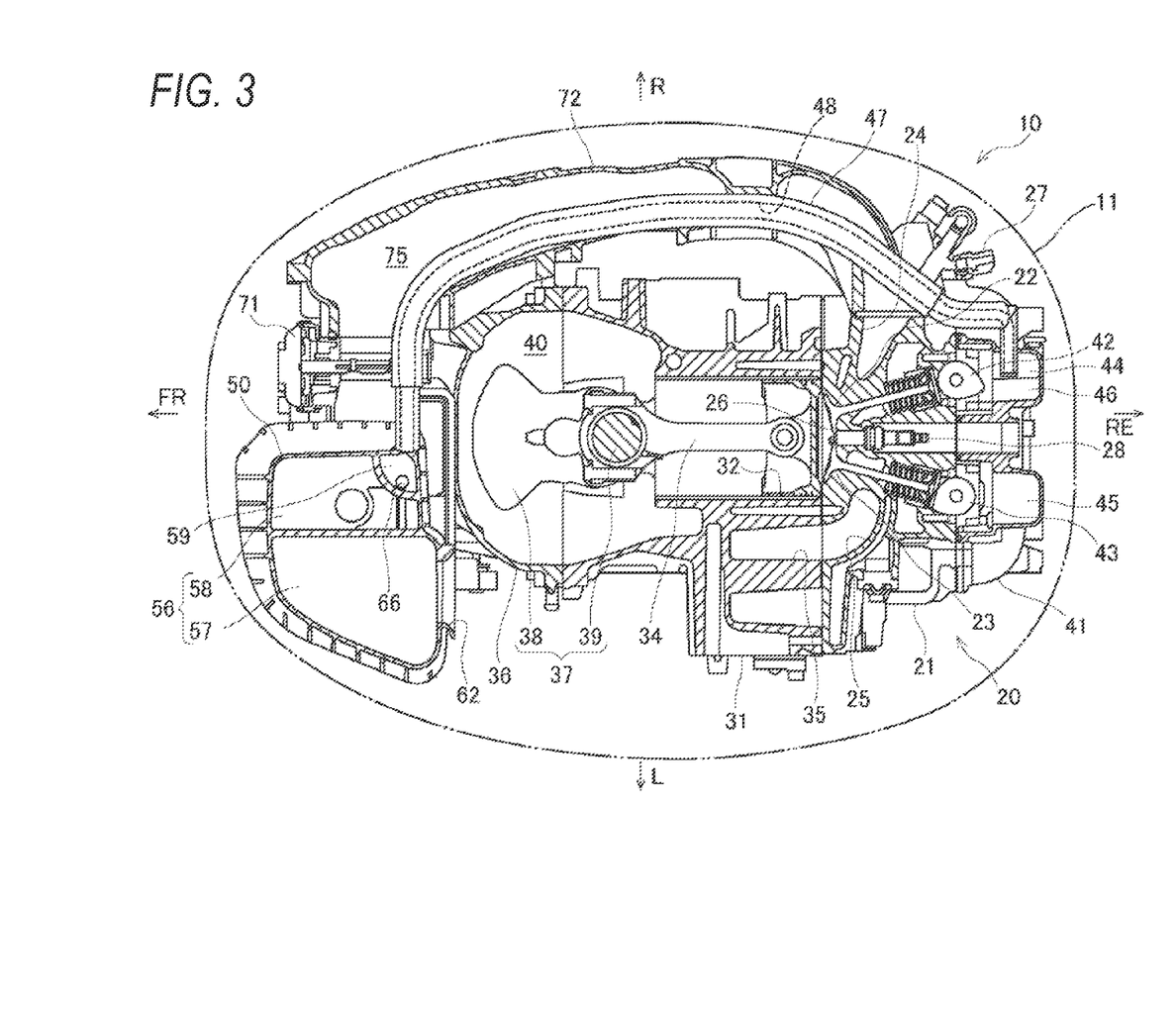
FIG. 3 is a sectional view of the outboard motor engine taken along a horizontal plane.

As shown in FIG. 3, in such an outboard motor engine 10, oil in the blow-by gas generated from a crank chamber 40 or the like of the engine main body 20 is returned to the intake passage 75 side through a breather passage 48 for re-combust. In a low engine speed range and a middle engine speed range, the intake pulsation is transmitted to the breather passage 48, and the oil in the breather passage 48 is easily sucked into the intake passage 75. On the other hand, in a high engine speed range, the flow in the intake passage 75 is fast and the intake pulsation effect on the breather passage 48 is difficult to appear. On the contrary, since the crank chamber pressure and the like increase in the high engine speed range, the oil in the blow-by gas leaked from the crank chamber 40 easily enters the breather passage 48.

In a typical outboard motor engine, depending on an engine rotation speed from the low engine speed range to the middle engine speed range, a positive pressure may act on an intake port of the intake passage due to the pulsating inertia effect (air column resonance effect), and oil may spout from the intake port to the inside of the engine cover. As described above, the oil easily enters the breather passage in the high engine speed range, and the oil is easily sucked from the breather passage into the intake passage in the low engine speed range. Therefore, when the high engine speed range and the low engine speed range are repeated, the oil sucked into the intake passage may spout from the intake port to the inside of the engine cover.

As the oil spouts from the intake port, the oil adheres to the parts inside the engine cover. Although a spout amount of the oil is very small, as the outboard motor engine is used for a long period of time, the adhesion of the oil not only remains as dirt but also causes the durability of the electric components and the workability of maintenance to deteriorate. Further, when a large amount of oil is sucked from the breather passage into the intake passage all at once, the proportion of unburned gas in the exhaust gas when the oil is re-combusted in the combustion chamber increases. For this reason, the unburned gas is likely to be discharged into the water at an exhaust destination, which is not preferable from the viewpoint of environmental measures.

Therefore, in the outboard motor engine 10 of the present embodiment, the silencer 50 on the upstream side of the intake passage 75 is formed with a resonator chamber 59 (see FIG. 3) communicating with the breather passage 48. Since the resonator chamber 59 is continuous with the breather passage 48 to increase the cavity volume, it becomes difficult for oil to be sucked from the resonator chamber 59 to the intake passage 75 when a positive pressure acts on the intake port 62 in the low engine speed range and the middle engine speed range. Further, the resonator chamber 59 also functions as a catch tank, and the oil is not sucked out directly from the breather passage 48 to the intake passage 75. Therefore, the spout of oil from the intake port 62 to the inside of the engine cover 11 and the excessive oil supply from the intake passage 75 to the combustion chamber 26 are prevented.

An internal structure of the outboard motor engine will be described with reference to FIG. 3. FIG. 3 is a sectional view of the outboard motor engine taken along a horizontal plane.

As shown in FIG. 3, the outboard motor engine 10 is provided with the silencer 50 made of resin and having a box shape on a left front side of the engine main body 20. The intake port 62 is opened on a rear surface of the silencer 50 toward the inside of the engine cover 11, and an outlet port 64 (see FIG. 5B) continuous with the inside of the throttle body 71 is opened on a right side surface of the silencer 50. Inside the silencer 50, a silencer chamber 56 that reduces intake noise when air is taken in through the intake port 62 and the resonator chamber 59 that functions as a catch tank that captures oil are formed. A detailed configuration of the silencer 50 will be described below.

On a right side of the silencer 50, the throttle body 71 that adjusts a flow rate of intake air from the outlet port 64 is provided. Inside the throttle body 71, a throttle valve (not shown) is rotatably supported via a drive shaft. On a right side of the throttle body 71, the intake manifold 72 branched from a surge tank into a plurality of intake pipes is provided. The intake manifold 72 passes through the right side of the engine main body 20 and is connected to a right side surface of a cylinder head 21. Further, a breather hose 47 that returns blow-by gas from the engine main body 20 to the silencer 50 is installed along the intake manifold 72.

The cylinder head 21 is provided with an intake valve 22 and an exhaust valve 23 for each cylinder. The intake valve 22 opens and closes an intake vent 24 continuous with the intake passage 75 of the intake manifold 72, and the exhaust valve 23 opens and closes an exhaust port 25 continuous with an exhaust passage 35 of a cylinder block 31. Air is taken into the combustion chamber 26 from the intake passage 75 by opening and closing the intake valve 22, and exhaust gas after combustion is discharged from the combustion chamber 26 to the exhaust passage 35 by opening and closing the exhaust valve 23. Further, the cylinder head 21 is provided with a fuel injection device 27 configured to inject fuel into the intake vent 24, and an ignition device 28 configured to ignite the air-fuel mixture in the combustion chamber 26.

The cylinder block 31 is provided in front of the cylinder head 21. A piston 32 is accommodated in the cylinder block 31 so as to be capable of reciprocating, and a piston ring that seals a gap between a piston outer surface and a cylinder wall surface is attached to the piston 32. The crankshaft 37 is connected to the piston 32 via a connecting rod 34. The crankshaft 37 is configured by connecting a crank web 38 to a crank pin 39 by a crank journal (not shown). The crankshaft 37 is rotatably supported by a crankcase 36 provided in front of the cylinder block 31.

A cylinder head cover 41 is provided behind the cylinder head 21. An intake camshaft 42 configured to drive the intake valve 22 and an exhaust camshaft 43 configured to drive the exhaust valve 23 are rotatably supported on mating surfaces of the cylinder head cover 41 and the cylinder head 21. The cylinder head cover 41 is formed with valve operating chambers 44 and 45 for the intake camshaft 42 and the exhaust camshaft 43. The valve operating chamber 44 on the intake side and the valve operating chamber 45 on the exhaust side are communicated with each other. A breather chamber 46 is formed in the valve operating chamber 44 on the intake side to separate the blow-by gas generated from the crank chamber 40 of the crankcase 36 and the like into gas and liquid.

The breather chamber 46 of the cylinder head cover 41 communicates with the resonator chamber 59 of the silencer 50 via the breather passage 48 of the breather hose 47. The resonator chamber 59 communicates with the silencer chamber 56 through a communication port 66. The oil in the blow-by gas enters the breather passage 48 from the breather chamber 46 and is trapped in the resonator chamber 59 at an outlet of the breather passage 48. The oil in the resonator chamber 59 is sucked into the silencer chamber 56 from the communication port 66 by the negative pressure in the intake passage 75. The oil in the silencer chamber 56 is sent from the silencer chamber 56 to the combustion chamber 26 of the engine main body 20 together with the air taken in through the intake port 62.

At this time, the cavity volume is increased by being communicated with the resonator chamber 59 and the breather passage 48. As described above, in the low engine speed range and the middle engine speed range, not only the negative pressure but also the positive pressure may act on the intake port 62 of the silencer 50 due to the intake pulsation. However, depending on the engine rotation speed, when the positive pressure acts on the intake port 62, the positive pressure is likely to act on an outlet of the resonator chamber 59, and the oil is difficult to be sucked out from the communication port 66. Therefore, the spout of oil from the intake port 62 to the inside of the engine cover 11 is reduced, and the adhesion of the oil to the peripheral parts of the intake port 62 is prevented.

The breather chamber 46 functions as a primary catch tank that captures the oil in the blow-by gas, and the resonator chamber 59 functions as a secondary catch tank that captures the oil that has passed through the breather passage 48. By capturing the oil in the resonator chamber 59, an amount of oil sucked into the silencer chamber 56 is reduced as compared with the configuration in which the oil is sucked directly from the breather passage 48 to the silencer chamber 56. A large amount of oil is not sent from the silencer chamber 56 to the combustion chamber 26 of the engine main body 20 all at once, a proportion of unburned gas in the exhaust gas is reduced, and environmentally friendly combustion is realized.

The communication port 66 of the resonator chamber 59 and the silencer chamber 56 is adjacent to the throttle valve on the upstream side of the throttle valve of the throttle body 71. Due to the negative pressure near the throttle valve, oil is smoothly guided from the communication port 66 to the engine main body 20. As described above, in the breather device of the present embodiment, the silencer 50 is provided with the resonator chamber 59 that is continuous with the outlet of the breather passage 48, and the communication port 66 between the resonator chamber 59 and the silencer chamber 56 is formed adjacent to the throttle valve. Therefore, the oil in the breather passage 48 and the resonator chamber 59 is stably guided from the intake passage 75 to the combustion chamber 26.

Figure 4A:
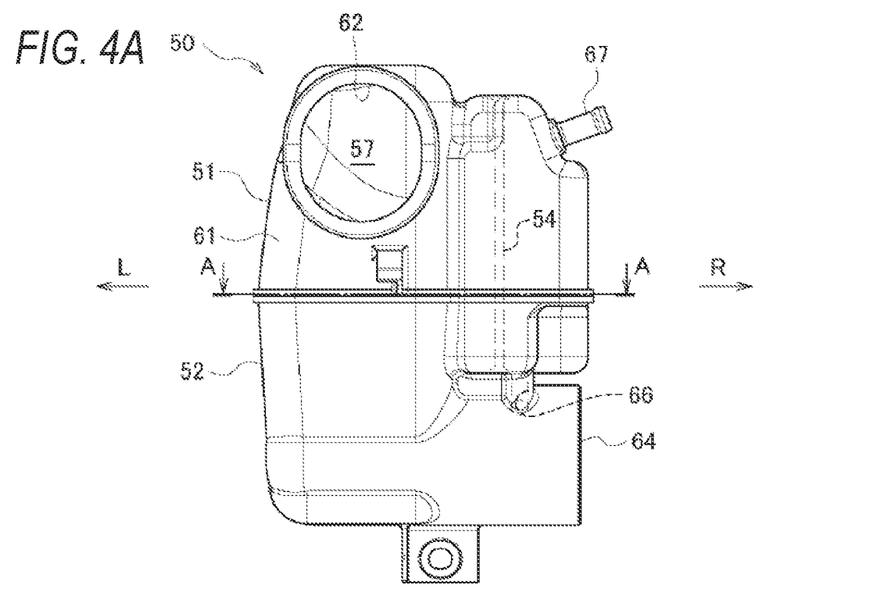
FIG. 4A is a rear view of a silencer.
Figure 4B:
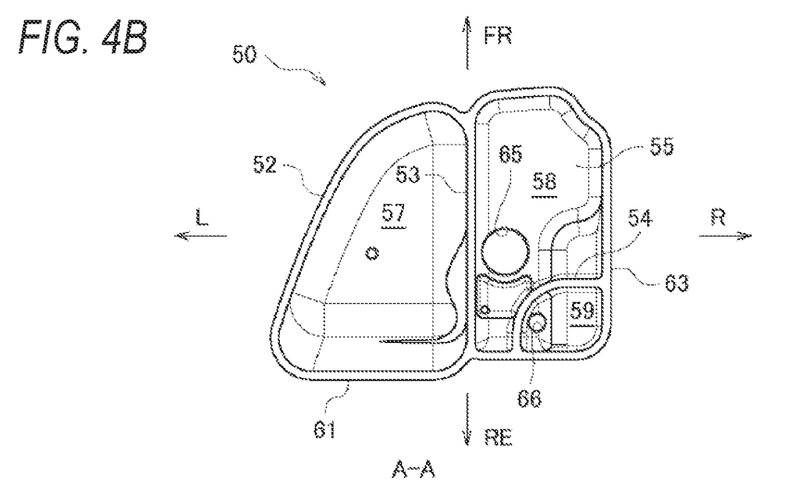
FIG. 4B is a sectional view of the silencer of FIG. 4A taken along A-A line.
Figure 5A:
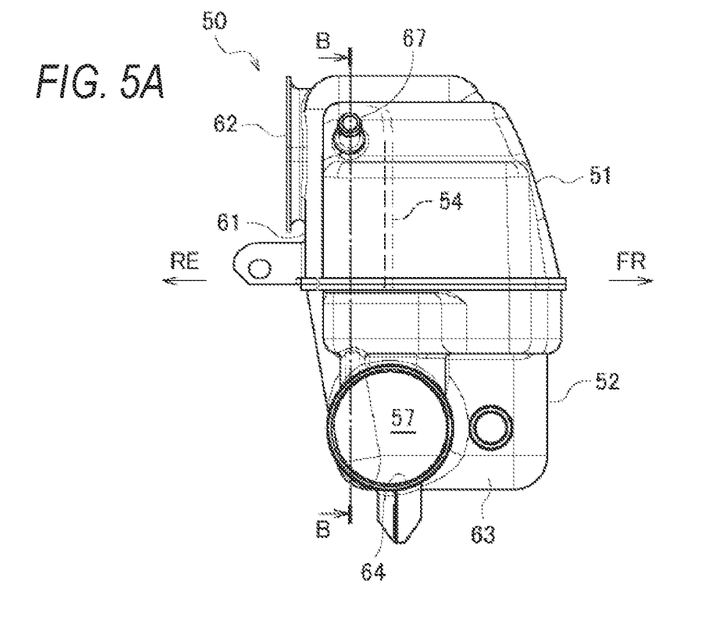
FIG. 5A is a right side view of the silencer.
Figure 5B:
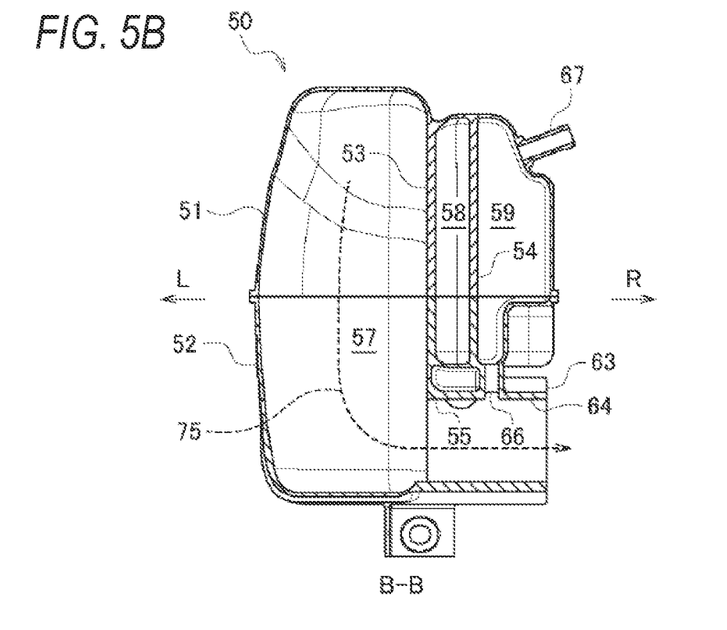
FIG. 5B is a sectional view of the silencer of FIG. 5A taken along B-B line.

The silencer will be described with reference to FIGS. 4A, 4B, 5A and 5B. FIG. 4A is a rear view of the silencer, and FIG. 4B is a sectional view of the silencer of FIG. 4A taken along a line A-A. FIG. 5A is a right side view of the silencer, and FIG. 5B is a sectional view of the silencer of FIG. 5A taken along a line B-B.

As shown in FIGS. 4A, 4B, 5A and 5B, the silencer 50 is formed by an upper case 51 and a lower case 52 so as to be separable in an upper-lower direction. The upper case 51 is formed in a box shape having an open lower surface, and the lower case 52 is formed in a box shape having an open upper surface. The inside of the upper case 51 and the lower case 52 is partitioned in left and right by a first partition wall 53, and the rear side of a space on the right side is further partitioned into a large size and a small size by a second partition wall 54. A space on the left side forms a first silencer chamber 57, and the two spaces on the right side form a second silencer chamber 58 and the resonator chamber 59.

In the lower case 52, the second silencer chamber 58 and a bottom wall 55 of the resonator chamber 59 are formed. A space below the bottom wall 55 of the lower case 52 expands the first silencer chamber 57 toward a right side surface 63. On a rear surface 61 of the upper case 51, the intake port 62 for taking in air from the inside of the engine cover 11 (see FIG. 1) to the first silencer chamber 57 is formed. On the right side surface 63 of the lower case 52, an outlet port 64 through which air is led from the first silencer chamber 57 to the throttle body 71 (see FIG. 1) is formed. An upstream side of the intake passage 75 that guides the air from the intake port 62 to the outlet port 64 is formed by the first silencer chamber 57.

The bottom wall 55 of the lower case 52 is formed with a through hole 65 through which the first silencer chamber 57 and the second silencer chamber 58 communicate with each other. Since the first silencer chamber 57 and the second silencer chamber 58 are communicated with each other, the silencing effect of intake noise is enhanced. As described above, the silencer chamber 56 of the silencer 50 is divided into the first silencer chamber 57 and the second silencer chamber 58 by the first partition wall 53 and the bottom wall 55. The communication port 66 that is communicated the first silencer chamber 57 and the resonator chamber 59 is formed in the bottom wall 55 of the lower case 52. A joint 67 to which the breather hose 47 (see FIG. 3) is connected is formed on an upper part of the upper case 51.

As described above, the cavity volume is increased by the resonator chamber 59 on the outlet side of the breather passage 48. In this case, a volume of the resonator chamber 59 is formed such that it is difficult for oil to be sucked from the communication port 66 to the first silencer chamber 57 when positive pressure acts on the intake port 62 due to intake pulsation. Further, the oil from the breather hose 47 is captured in the resonator chamber 59, so that it is possible to prevent the oil from directly entering the first silencer chamber 57 from the breather hose 47. Further, the communication port 66 is opened near the outlet port 64 adjacent to the throttle valve so that the negative pressure near the throttle valve can be used.

Figure 6A:
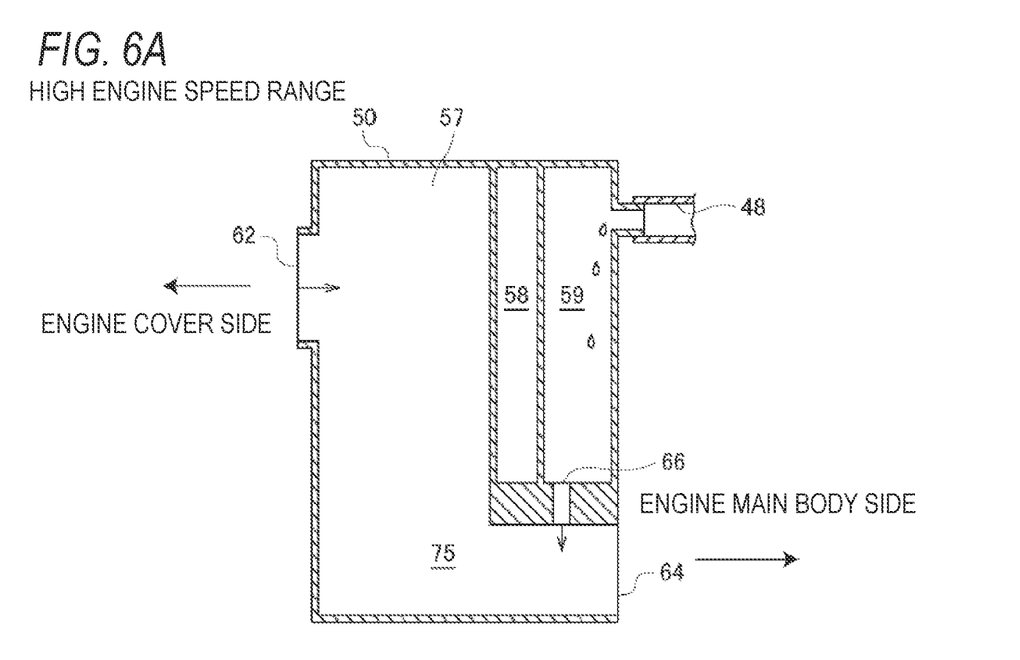
FIG. 6A is diagrams showing a flow of oil in the silencer, at a high engine speed range.
Figure 6B:
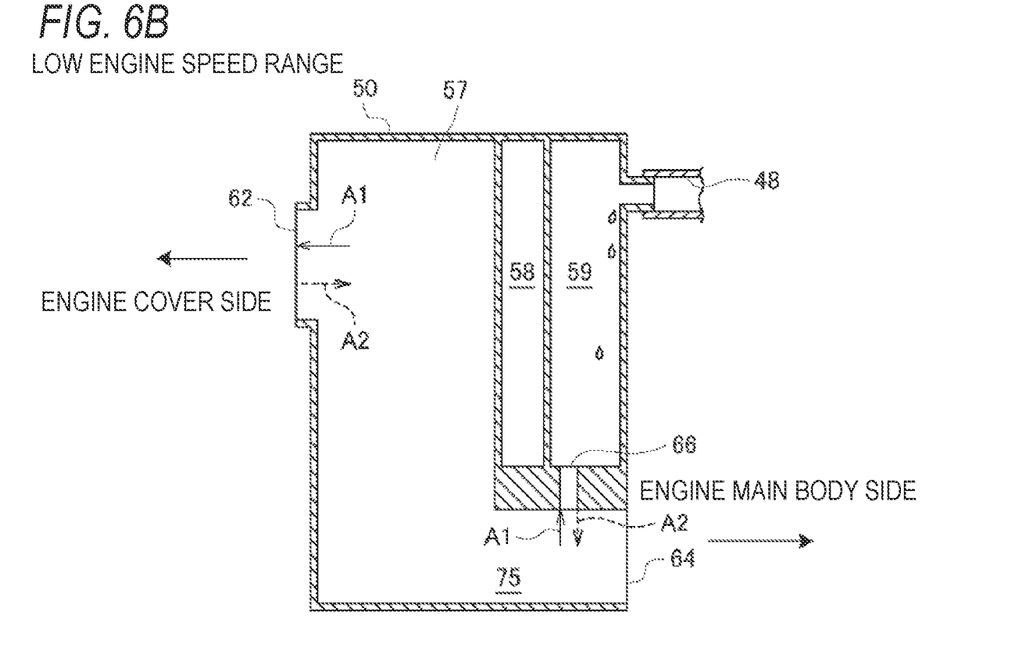
FIG. 6B is diagrams showing a flow of oil in the silencer, at a low engine speed range.

The flow of oil in the silencer will be described with reference to FIGS. 6A and 6B. FIG. 6A shows an example of a flow of oil in the high engine speed range, and FIG. 6B shows an example of a flow of oil in the low engine speed range. FIGS. 6A and 6B, the silencer is schematically shown for convenience of explanation.

As shown in FIG. 6A, in the high engine speed range, the crank chamber pressure increases, so that oil flows from the breather chamber 46 (see FIG. 3) of the engine main body 20 through the breather passage 48 into the resonator chamber 59 of the silencer 50. In the high engine speed range, the flow in the intake passage 75 is fast and the intake pulsation effect is hard to appear. Since the intake passage 75 has a negative pressure, the oil in the resonator chamber 59 is sucked out from the communication port 66 by the negative pressure. At this time, since negative pressure is also acting on the intake port 62, the oil sucked out from the communication port 66 will not spout from the intake port 62 to the inside of the engine cover 11 (see FIG. 1).

As shown in FIG. 6B, in the low engine speed range, the intake pulsation is transmitted to the breather passage 48 and the resonator chamber 59, and the oil in the resonator chamber 59 is easily sucked out from the communication port 66. On the other hand, in the middle engine speed range, positive pressure may act on the intake port 62 due to the intake pulsation. In this way, when positive pressure acts on the intake port 62, the volume of the resonator chamber 59 makes it difficult for the oil in the resonator chamber 59 to be sucked out from the communication port 66. Specifically, the volume of the resonator chamber 59 is designed such that when positive pressure acts on the intake port 62, positive pressure also acts on the communication port 66, and when negative pressure acts on the intake port 62, negative pressure also acts on the communication port 66.

As shown by the solid arrow A1, when positive pressure acts on the intake port 62 due to the intake pulsation, positive pressure also acts on the communication port 66, which makes it difficult for the oil to be sucked out from the communication port 66. Therefore, the spout of oil from the intake port 62 to the inside of the engine cover 11 is prevented. As shown by the dashed arrow A2, when negative pressure acts on the intake port 62 due to the intake pulsation, negative pressure also acts on the communication port 66, which makes it easy for the oil to be sucked out from the communication port 66. Therefore, together with the air taken in through the intake port 62, the oil sucked out through the communication port 66 is sent into the combustion chamber 26 through the intake passage 75.

As described above, according to the present embodiment, the resonator chamber 59 communicates with the breather passage 48, so that the cavity volume increases. When positive pressure acts on the intake port 62 due to the intake pulsation in the low engine speed range and the middle engine speed range, suction of oil from the resonator chamber 59 is prevented. Further, the resonator chamber 59 functions as a catch tank and prevents oil from being sucked out directly from the breather passage 48. Therefore, the spout of oil from the intake port 62 to the inside of the engine cover 11 is prevented, and dirt caused by the oil inside the engine cover 11 is reduced. Further, a large amount of oil is not sucked into the engine main body 20 all at once, and a proportion of unburned gas in exhaust gas can be reduced.

Figure 7A:
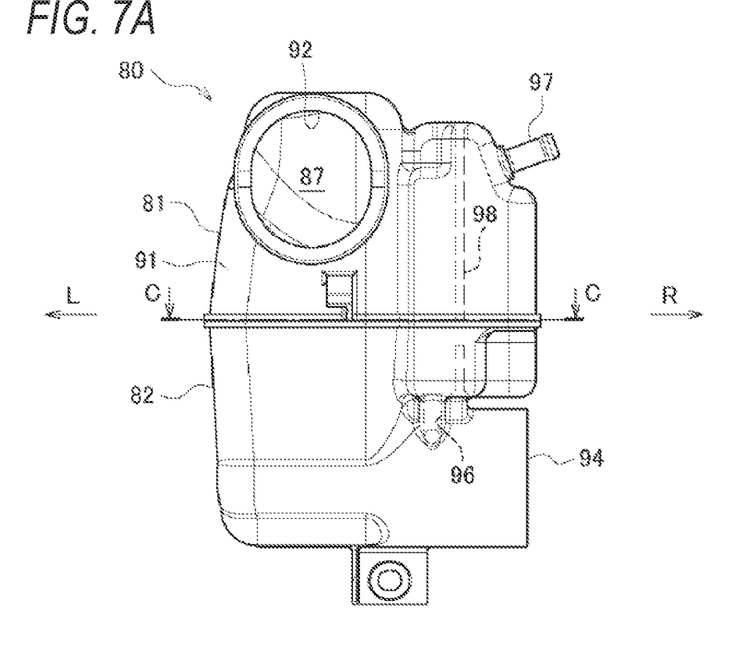
FIG. 7A is a rear view of a silencer according to a modification.
Figure 7B:
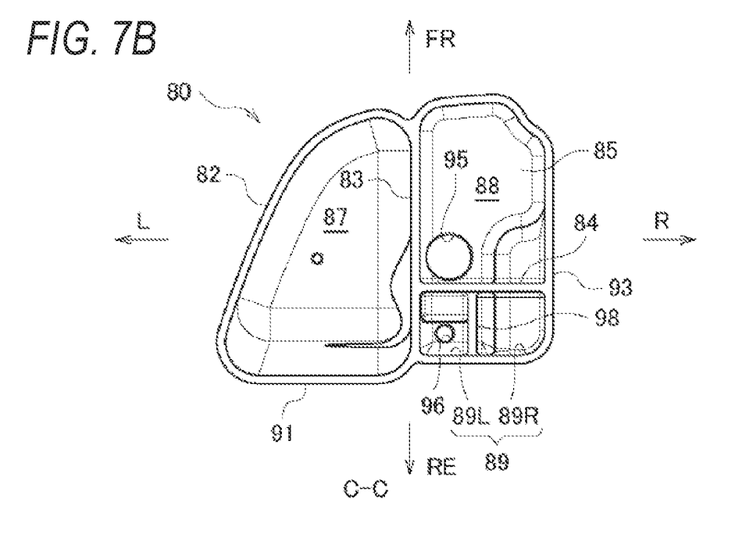
FIG. 7B is a sectional view of the silencer of FIG. 7A taken along C-C line.
Figure 8A:
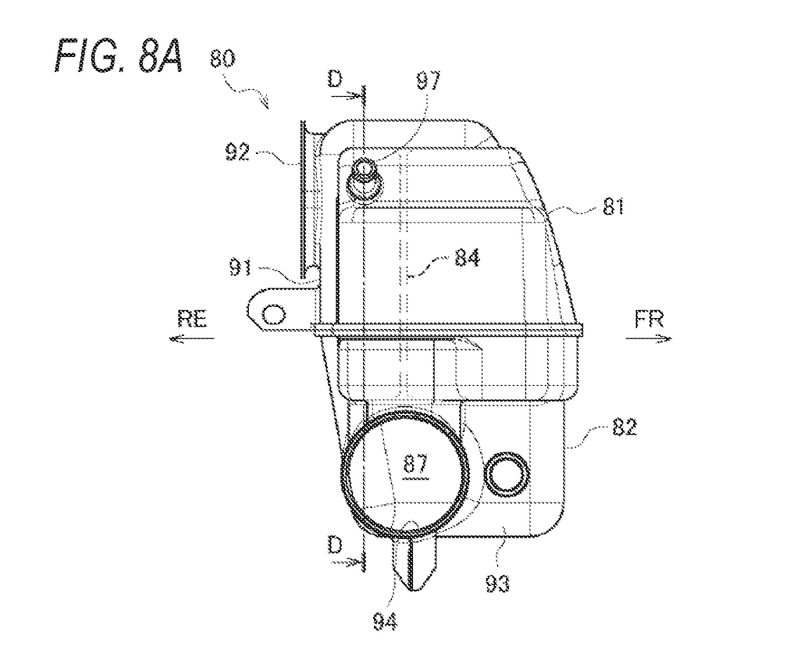
FIG. 8A is a right side view of the silencer according to the modification.
Figure 8B:
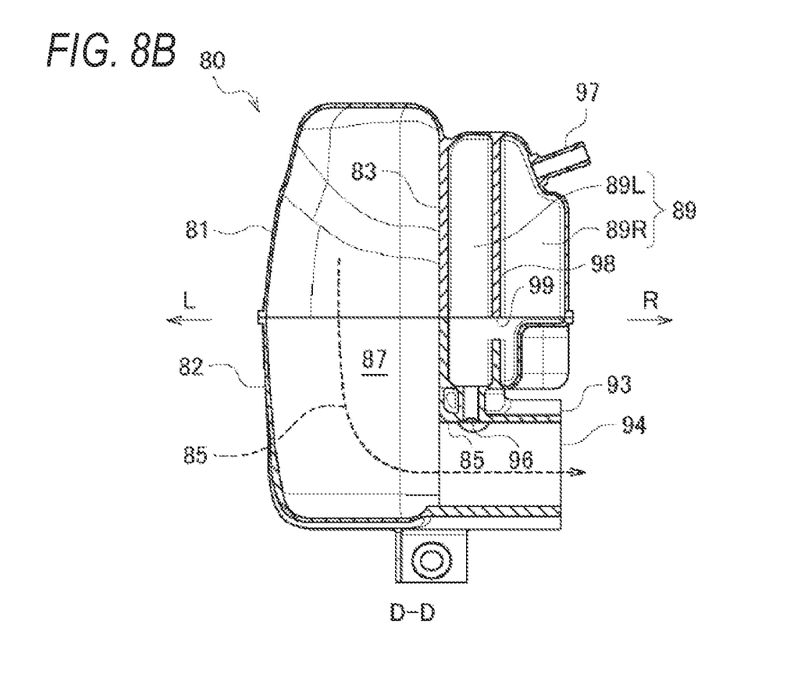
FIG. 8B is a sectional view of the silencer of FIG. 8A taken along D-D line.

The resonator chamber of the silencer may have a labyrinth structure. Next, a silencer according to a modification will be described with reference to FIGS. 7A, 7B, 8A and 8B. FIG. 7A is a rear view of the silencer according to the modification, and FIG. 7B is a sectional view of the silencer of FIG. 7A taken along a line C-C. FIG. 8A is a right side view of the silencer according to the modification, and FIG. 8B is a sectional view of the silencer of FIG. 8A taken along a line D-D. The silencer according to the modification is different from the silencer according to the present embodiment in the resonator chamber. Therefore, the description of the same configuration as that of the silencer according to the present embodiment is omitted as much as possible.

As shown in FIGS. 7A, 7B, 8A and 8B, an inside of an upper case 81 and a lower case 82 of a silencer 80 is partitioned in left and right by a first partition wall 83, and a space on the right side is further partitioned by a second partition wall 84 in the front and back. A space on the left side forms a first silencer chamber 87, and the two spaces in the front and back on the right side form a second silencer chamber 88 and a resonator chamber 89. An intake port 92 continuous with the first silencer chamber 87 is formed on a rear surface 91 of the upper case 81, and an outlet port 94 continuous with the first silencer chamber 87 is formed on a right side surface 93 of the lower case 82.

The resonator chamber 89 is partitioned into left and right by a third partition wall 98. In the third partition wall 98, a gap 99 for allowing oil to pass from a right compartment 89R to a left compartment 89L of the resonator chamber 89 is formed. A joint 97 to which the breather hose 47 is connected is formed at an upper part of the upper case 81 so that oil is taken into the right compartment 89R. A bottom wall 85 of the lower case 82 is formed with a communication port 96 through which the left compartment 89L and the first silencer chamber 87 are communicated with each other. In this way, the labyrinth structure is formed in the resonator chamber 89 by providing the third partition wall 98 between the left compartment 89L and the right compartment 89R.

When the oil flows from the breather passage 48 into the right compartment 89R, the third partition wall 98 prevents the oil from flowing from the right compartment 89R to the left compartment 89L. Therefore, it is possible to prevent a large amount of oil from being sucked out from the communication port 96 all at once due to the intake pulsation. In the modification, a volume of the resonator chamber 89 is also formed such that it is difficult for oil to be sucked from the communication port 96 to the first silencer chamber 87 when positive pressure acts on the intake port 92 due to the intake pulsation. Further, the bottom wall 85 of the lower case 82 is formed with a through hole 95 through which the first silencer chamber 87 and the second silencer chamber 88 communicate with each other.

Similarly to the present embodiment, in the silencer 80 according to the modification, the spout of oil from the intake port 92 to the inside of the engine cover 11 is also prevented, so that a proportion of unburned gas in the exhaust gas can be reduced.

In the present embodiment, the resonator chamber is formed in the silencer, but the present disclosure is not limited to this configuration. The resonator chamber may be formed in a member other than the silencer. Therefore, the silencer chamber and the resonator chamber may be formed as separate members.

In the present embodiment, a configuration in which the communication port between the resonator chamber and the intake passage is adjacent to the throttle valve is described, but the present disclosure is not limited to this configuration. The communication port between the resonator chamber and the intake passage is preferably formed on the upstream side of the throttle body, and may be formed adjacent to the throttle valve and on a downstream side of the throttle body.

In the present embodiment, the silencer chamber is formed on the upstream side of the intake passage, but the present disclosure is not limited to this configuration. The upstream side of the intake passage may be on the intake port side with respect to the middle of the intake passage from the intake port to the outlet of the intake manifold. Therefore, the resonator chamber may communicate with any position on the intake port side with respect to the middle of the intake passage.

In the present embodiment, the first silencer chamber and the second silencer chamber are formed in the silencer as silencer chambers, but the present disclosure is not limited to this configuration. A single silencer chamber may be formed in the silencer.

As described above, the breather device for an outboard motor engine (10) according to the present embodiment is a breather device for an outboard motor engine including a breather chamber (46) formed in an engine main body (20), and an intake passage (75) guiding air into the engine main body, in which an intake port (62) of the intake passage is open inside an engine cover (11) that covers the engine main body. The breather device includes a resonator chamber (59) communicating with an upstream side of the intake passage, and a breather passage (48) extending from the breather chamber and communicating with the resonator chamber. According to this configuration, the resonator chamber communicates with the breather passage, so that the cavity volume increases. When positive pressure acts on the intake port due to intake pulsation in an engine speed range, such as in a middle engine speed range, suction of oil from the resonator chamber is prevented. Further, the resonator chamber functions as a catch tank so as to prevent the oil from being sucked directly from the breather passage. Therefore, the spout of oil from the intake port to the inside of the engine cover is prevented, and dirt caused by the oil inside the engine cover is reduced. Further, a large amount of oil is not sucked into the engine main body all at once, and a proportion of unburned gas in exhaust gas can be reduced.

In the breather device for the outboard motor engine according to the present embodiment, a throttle body (71) is provided in the intake passage, and a communication position (communication port 66) between the resonator chamber and the intake passage is located on an upstream side of a throttle valve of the throttle body. According to this configuration, negative pressure acting on the upstream side of the throttle valve can be used to guide the oil from the communication position to the engine main body.

In the breather device for the outboard motor engine according to the present embodiment, the communication position between the resonator chamber and the intake passage is adjacent to the throttle valve. According to this configuration, oil can be guided more smoothly from the communication position to the engine main body by using the negative pressure near the throttle valve.

In the breather device for the outboard motor engine according to the present embodiment, a silencer chamber (56) formed in a silencer is provided on the upstream side of the intake passage, and the resonator chamber is formed in the silencer so as to communicate with the silencer chamber. According to this configuration, the silencer chamber and the resonator chamber are formed in the silencer, so that the number of parts and the cost can be reduced.

In the breather device for the outboard motor engine according to the present embodiment, the resonator chamber has a labyrinth structure. According to this configuration, the oil is trapped by the resonator chamber having the labyrinth structure, and a large amount of oil is prevented from flowing into the intake passage from the resonator chamber all at once.

Although the present embodiment has been described, the above-described embodiment and the modification may be combined in whole or in part as another embodiment.

The technique of the present disclosure is not limited to the above-described embodiment, and various changes, substitutions, and modifications may be made without departing from the spirit of the technical idea of the present disclosure. Further, the present disclosure may be implemented using other methods as long as the technical concepts of the present disclosure can be implemented by the methods through advance of the technology or other derivative technology. Accordingly, the claims cover all embodiments that may be included within the scope of the technical concepts.

What is claimed is:

1. A breather device for an outboard motor engine, the outboard motor engine including a breather chamber formed in an engine main body, and an intake passage guiding air into the engine main body, wherein an intake port of the intake passage is open inside an engine cover that covers the engine main body, the breather device comprising:
   a resonator chamber communicating with an upstream side of the intake passage; and
   a breather passage extending from the breather chamber and communicating with the resonator chamber, wherein
   the resonator chamber has a labyrinth structure, and
   the labyrinth structure is a structure in which the resonator chamber is partitioned into two compartments by a partition wall and a gap to allow an oil to pass through the two compartments is formed in the partition wall.

2. The breather device according to claim 1, wherein
   a throttle body is provided in the intake passage, and
   a communication position between the resonator chamber and the intake passage is located on an upstream side of a throttle valve of the throttle body.

3. The breather device according to claim 2, wherein
   the communication position between the resonator chamber and the intake passage is adjacent to the throttle valve.

4. The breather device according to claim 1, wherein
   a silencer chamber formed in a silencer is provided on the upstream side of the intake passage, and
   the resonator chamber is formed in the silencer so as to communicate with the silencer chamber.

* * * * *